(«United States Patent [19]

Selmek

[11] 3,886,766
[45] June 3, 1975

[54] UNIVERSAL JOINT
[75] Inventor: Emil C. Selmek, Temperance, Mich.
[73] Assignee: Ford Motor Company, Dearborn, Mich.
[22] Filed: Dec. 3, 1973
[21] Appl. No.: 421,469

[52] U.S. Cl. .................................. 64/17 R; 64/6
[51] Int. Cl. ............................................. F16d 3/26
[58] Field of Search .......... 64/17 R, 17 A, 17 SP, 6, 64/8, 23

[56] References Cited
UNITED STATES PATENTS

| | | | |
|---|---|---|---|
| 699,904 | 5/1902 | Warren | 64/17 R |
| 848,652 | 4/1907 | Hughes | 64/17 R |
| 2,024,777 | 12/1935 | Neumann | 64/17 A |
| 2,648,207 | 8/1953 | Quinn | 64/17 R |
| 3,554,557 | 1/1971 | Baker et al. | 64/17 R |

Primary Examiner—Samuel Scott
Assistant Examiner—Randall Heald
Attorney, Agent, or Firm—Clifford L. Sadler; Keith L. Zerschling

[57] ABSTRACT

In accordance with the preferred embodiment of this disclosure, a universal joint has first and second yoke members with each of the yokes having a pair of spaced apart arms. A pair of bearing members pivotally engage the arms of the first yoke. A pivot pin extends between the arms of the second yoke and engages the two bearing members with an interference fit whereby the bearing members are held in engagement with the arms of the first yoke.

9 Claims, 9 Drawing Figures

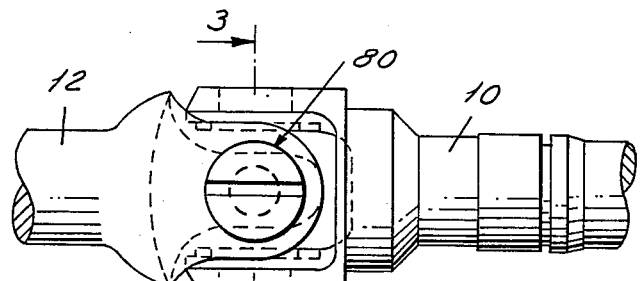
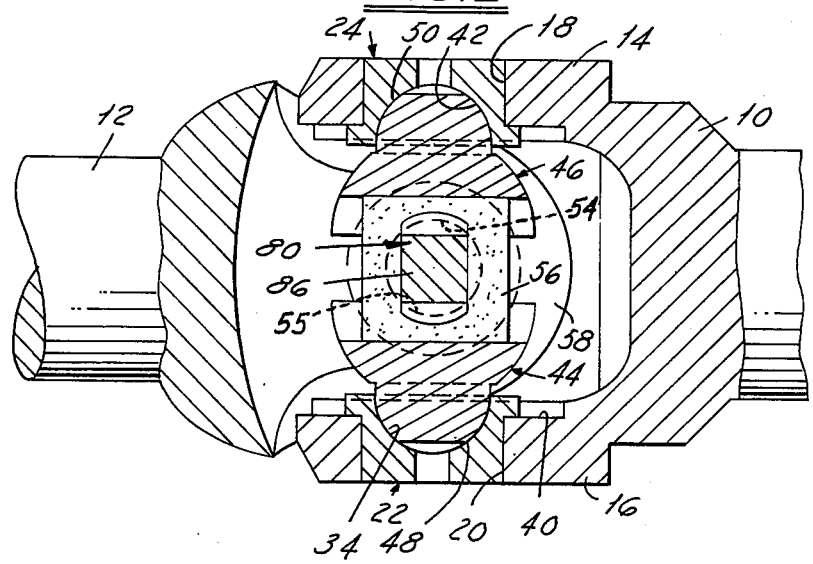
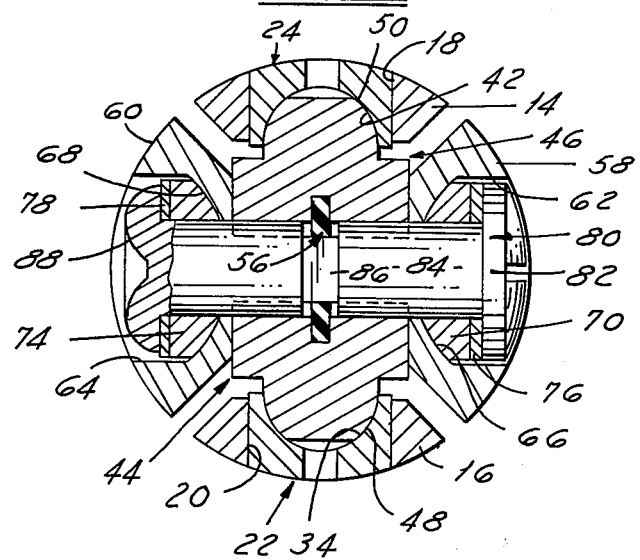

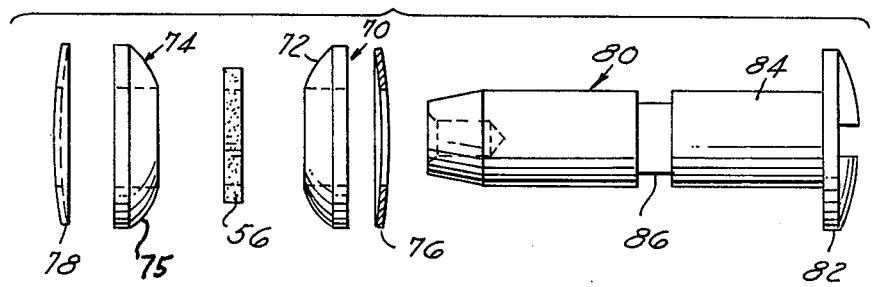
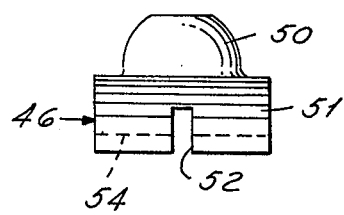
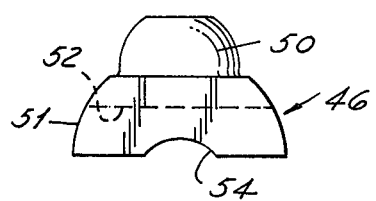
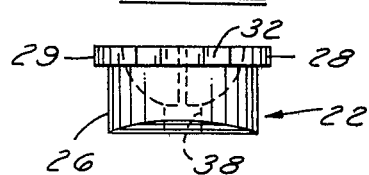
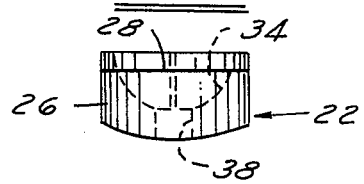
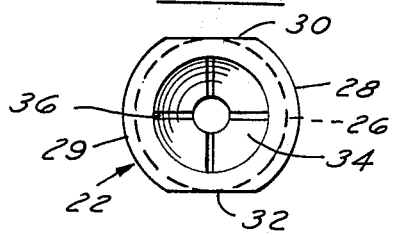

3,886,766

UNIVERSAL JOINT

BACKGROUND AND SUMMARY OF THE DISCLOSURE

It is the principal object of the present invention to provide an improved universal joint of simplified construction in which there is no backlash or free play.

In accordance with the preferred embodiment of the invention, a universal joint has a first yoke with a first pair of spaced arms. A second yoke has a second pair of spaced arms that are arranged 90° to the arms of the first yoke. A pair of inserts are received in the arms of the first yoke and have inwardly facing spherical bearing surfaces. A pair of bearing members are situated between the inserts and have outwardly facing spherical bearing surfaces slidably engaging the bearing surfaces of the inserts.

A pivot pin extends between the arm of the second yoke. Annular bearing members are interposed between the ends of the pin and the arms of the second yoke. The pivot pin engages semi-cylindrical surfaces on the bearing members with an interference fit whereby the bearing members are urged radially outwardly into engagement with the inserts.

This construction provides a bearing that is particularly characterized by the fact that there is no free play between the two yoke members. This desirable feature is achieved in a universal joint of economical construction.

BRIEF DESCRIPTION OF THE DRAWINGS

The many objects and advantages of a universal joint constructed in accordance with this invention become apparent upon consideration of the following detailed description and the accompanying drawings, in which:

FIG. 1 is an elevational view of a new universal joint;

FIG. 2 is an enlarged longitudinal sectional of the universal joint of FIG. 1;

FIG. 3 is a sectional view taken along section lines 3—3 of FIG. 1;

FIG. 4 is an exploded view in elevation of the pivot pin, annular bearings and spring washers that interconnect the arms of one of the yokes prior to assembly of the joint;

FIG. 5 is an elevational view of one side of one bearing insert;

FIG. 6 is an elevational view of another side of the bearing insert of FIG. 5;

FIG. 7 is a plan view of the bearing insert of FIGS. 5 and 6;

FIG. 8 is an elevational view of one side of one of the bearing members; and

FIG. 9 is an elevational view of another side of the bearing member of FIG. 8.

DETAILED DESCRIPTION OF THE PREFERRED EMBODIMENT

The presently preferred embodiment of this invention is illustrated in the drawings. FIG. 1 shows a universal joint having pivotally connected first and second yoke members 10 and 12.

The yoke 10 has a pair of spaced apart arms 14 and 16. The arms 14, 16 are provided with aligned bores 18 and 20 in which bearing inserts 22 and 24 are fitted.

The construction of insert 22 is illustrated in detail in FIGS. 5, 6 and 7. Insert 24 is similarly constructed. The bearing insert 22 has a cylindrical exterior surface 26 that is dimensioned to be received in the bore 20. A pair of arcuate flanges 28 and 29 are situated at one end of the cylindrical surface 26 and are separated by flat surfaces 30 and 32. The interior of the bearing insert 22 includes a hemispherical bearing surface 34 which is provided with four lubricating grooves 36. A hole 38 is provided in the insert 22 to convey lubricant to the hemispherical bearing surface 34.

Referring to FIG. 2, a ledge 40 is ground into the inner surface of yoke arm 16 to form a surface against which the arcuate flanges 29 and 29 are seated. The ledge 40 provides a surface for positioning and locating the insert 22 in the bore 20.

The bearing insert 24 is identical in construction to the insert 22 and is located in the yoke arm 14 in a similar manner as seen in FIG. 2. The insert 24 has a hemispherical bearing surface 42. When the inserts 22 and 24 are positioned in the bores 18 and 20 as shown in FIG. 2, the bearing surfaces 34 and 42 face inwardly.

A pair of bearing members 44 and 46 have outwardly hemispherical bearing surfaces 48 and 50, respectively, that slidably engage the bearing surfaces 34 and 42 of the inserts 22 and 24. The bearing members 44 and 46 are of identical construction. The configuration of bearing member 46 is shown in FIGS. 8 and 9. The bearing member 46 has a truncated hemispherican bearing surface 50 positioned on a body portion 51 having square ends and curved sides. A slot 52 cut in the bearing member 46 extends in a direction parallel to the axis of the yoke 10 when the bearing member 46 is in its operative position as seen in FIG. 2. A semi-cylindrical surface 54 is machined into the body portion 51 and extends in a direction normal to the slot 52.

Being identical to bearing member 44, member 46 is also provided with a slot 53 (similar to slot 52) and a semi-cylindrical surface 55 (similar to surface 54).

In the assembled joint as seen in FIG. 2, the bearing members 44 and 48 are located between the inserts 22 and 24 with the respective bearing surfaces 34 and 48 and bearing surfaces 42 and 50 in slidable engagement.

The joint has a generally square rubber element 56 interposed between the bearing members 44 and 46 with its edges seated in the slots 52 and 53. The rubber element member 56 exerts a slight force urging the bearing members 44 and 46 radially outwardly. It serves its principal function during the assembly of the universal joint as will be described later.

The yoke 12 has a pair of spaced apart arms 58 and 60. The arms 58 and 60 are provided with dual diameter bores 62 and 64. The bore 62 in arm 58 includes a large diameter portion, a small diameter portion and a bearing surface 66 of partially spherical shape. Similarly, dual diameter bore 64 has a large diameter portion, a small diameter portion, and a bearing surface 68 that interconnects the two portions of the bore.

An annular bearing element 70 is positioned in the bore 62 and has a bearing surface 72 that engages the bearing surface 66. Similarly, an annular bearing 74 is positioned in the bore 64 and has a bearing surface 75 that engages the surface 68.

Belleville-type spring washers 76 and 78 are situated radially outwardly of the annular bearing elements 70 and 74. A pivot pin 80 extends between the yoke arms 58 and 60. The pivot pin 80 has a head portion 82 that is positioned against the spring washer 76. The shank 84 extends through the centers of the spring washer 76 and bearing 70 and it engages the semi-cylindrical surfaces 54, 55 of the bearing members 44 and 46.

The rubber element 56 has a central opening through which the pin shank 84 extends. The rubber element 56 is fitted on a reduced portion 86 of the shank 84.

The other end of the shank portion 84 extends through the centers of the bearing 74 and the spring washer 78. A deformed end 88 on the end of the pivot pin 80 (as seen in FIG. 3) holds the assembly together.

One of the distinctive characteristics of a universal joint constructed in accordance with this invention is the fact that the joint has no free play. This will become apparent from the following description of the manner in which the joint is assembled.

During assembly, the bearing inserts 22, 24 are fitted in the holes 18, 20 of the yoke arms 14, 16. The flanges 28, 29 of the inserts 22, 24 are seated on the ledges 40 with the bearing surfaces 34, 42 facing inwardly. The bearing members 44, 46 are positioned with their bearing surfaces 48 and 50 in slidable engagement with the bearing surfaces 34, 42 of the inserts 22, 24. The resilient member 56 is then positioned in the slots 52, 53 of the bearing members 44, 46. The resilient member 56 urges the members 44, 46 radially outwardly and holds them in engagement with the inserts 22, 24 during assembly of the joint.

By using an appropriate gauge, the spacing between the semi-cylindrical surfaces 54 and 55 of the bearing members 44 and 46 is noted. Based upon the noted spacings, a pin 80 of appropriate size to preload the joint is selected.

The yoke 12 is arranged with the arms 58, 60 at 90 degrees to the yoke arms 14, 16. Prior to assembly, the pivot pin 80 has a configuration as shown in FIG. 4 with a head 82 at one end and a taper at the other end. The bearing 70 and spring washer 76 are positioned in the bore 62 and the pin 80 is inserted through their centers and through the hole in the center of the rubber element 56. The tapered end of the pin 80 protrudes through the bore 64 in yoke arm 60. The bearing 74 and spring washer 78 are then positioned on the protruding end of the pin 80. The assembly is completed by engaging the tapered end of the pin 80 with a deforming tool and spinning over the end of the pin to form the head 88. This is done under pressure whereby the normally saucer-shape spring washers 76 and 78 are deflected to a flat condition.

Based upon the determined spacing between the semi-cylindrical surfaces 54 and 55, a pin 80 is selected having a shank portion 84 of slightly greater diameter whereby a nominal interference fit is provided when the pin 80 is inserted between the bearings 44 and 46 (as shown in FIG. 3). The interference engagement between the shank 84 and the bearing members 44 and 46 urges the bearing members radially outwardly and into firm engagement with the inserts 22 and 24.

Thus, it is apparent that a universal joint is provided having no free play. The interference fit between the shank 84 of the pin 80 and the bearing members 44, 46 prevents any free play in a vertical direction as seen in FIG. 3. The loading of the spring washers 76, 78 when the head 88 of pin 80 is formed, loads the joint in a horizontal direction (also as seen in FIG. 3). Therefore, the universal joint illustrated and described has no free play. In addition, the disclosed embodiment does not rely on any threaded components to eliminate free play.

The foregoing description presents the presently preferred embodiment of this invention. Modifications and alterations may occur to those skilled in the art that will come within the scope and spirit of the following claims.

I claim:

1. A universal joint comprising a first yoke having a first pair of spaced arms,
   a pair of bearing members pivotally engaging said first pair of arms,
   a second yoke having a second pair of spaced arms,
   a pivot member extending between said second pair of arms,
   means pivotally connecting said pivot member to said second pair of arms,
   said pivot member being interposed between said pair of bearing members,
   said pivot member being constructed to hold said bearing members in engagement with said first pair of arms.

2. A universal joint comprising a first yoke having a first pair of spaced apart arms,
   said arms each having means defining an inwardly facing bearing surface,
   a pair of bearing members having outwardly facing bearing surfaces engaging said bearing surfaces of said means,
   a second yoke having a second pair of spaced apart arms,
   a pivot member extending between said second pair of arms and having means pivotally connecting said pivot member to said second pair of arms,
   said pivot member being interposed between said pair of bearing members,
   said pivot member being constructed to urge said bearing members radially outwardly into engagement with the bearing surfaces of said means.

3. A universal joint comprising a first yoke having a first pair of spaced apart arms,
   said arms having means providing inwardly facing bearing surfaces,
   a pair of bearing members having outwardly facing bearing surfaces slidably engaging said bearing surfaces of said means,
   said bearing members having inwardly facing and spaced apart surfaces,
   a second yoke having a second pair of spaced apart arms,
   a pivot member extending from one of said second arms to the other of said second arms and having a portion engaging said spaced apart surfaces of said bearing members,
   said pivot member portion urging said bearing members radially outwardly into engagement with said bearing surfaces of said means.

4. A universal joint according to claim 3 and including:
   said pivot member portion having a greater lateral dimension than the normal distance between said spaced apart surfaces.

5. A universal joint according to claim 3 and including:
   said inwardly facing surfaces of said bearing members having semi-cylindrical shape,
   said pivot member having a cylindrical shank portion engaging said inwardly facing surfaces of said bearing members.

6. A universal joint according to claim 3 and including:
 said inwardly facing surfaces of said bearing members having semi-cylindrical shape,
 said pivot member having a cylindrical shank portion engaging said inwardly facing surfaces of said bearing members,
 the diameter of said shank portion being a greater dimension than the normal distance between said inwardly facing surfaces of said bearing members.

7. A universal joint having a first pair of spaced apart arms,
 said arms having means providing inwardly facing bearing surfaces,
 a pair of bearing members having outwardly facing bearing surfaces slidably engaging said bearing surfaces of said means,
 said bearing members having inwardly facing and spaced apart surfaces,
 a second yoke having a second pair of spaced apart arms,
 a pivot member extending from one of said second arms to the other of said second arms and having a portion engaging said spaced apart surfaces of said bearing members,
 said pivot member portion urging said bearing members radially outwardly into engagement with said bearing surfaces of said means,
 resilient means operatively interposed between said pivot member and said second yoke,
 said resilient means being constructed to limit the free play of said joint.

8. A universal joint comprising a first yoke having a first pair of spaced apart arms,
 said first arms supporting a pair of bearing inserts having inwardly facing hemispherical bearing surfaces,
 a pair of bearing members having outwardly facing hemispherical bearing surfaces slidably engaging said bearing surfaces of said inserts,
 said bearing members having inwardly facing spaced apart semi-cylindrical surfaces,
 a second yoke having a second pair of spaced apart arms,
 said second arms each having an outwardly facing bearing surface,
 a bearing member seated on each of said surfaces,
 a spring washer seated on each of said just-mentioned bearing members,
 a pivot pin extending from one of said second arms to the other of said second arms and having a first head portion engaging one of said spring washers and a second head portion engaging the other of said spring washers,
 said pin having a shank portion engaging said semi-cylindrical surfaces of said first-mentioned bearing members,
 said shank portion holding said first-mentioned bearing members radially outwardly in engagement with said bearing surfaces of said inserts.

9. A universal joint according to claim 8 and including:
 said shank portion of said pivot pin having a greater lateral dimension than the normal distance between said semi-cylindrical surfaces.

* * * * *